United States Patent
Barbosa et al.

(10) Patent No.: US 11,590,745 B2
(45) Date of Patent: Feb. 28, 2023

(54) PARTIALLY COATED FILMS AND PACKAGES FORMED FROM SAME

(71) Applicant: Dow Global Technologies LLC, Midland, MI (US)

(72) Inventors: Bruno Cesar De Moraes Barbosa, Campinas (BR); João Gargalaka, Jr., São Paulo (BR); Nicolas Cardoso Mazzola, Jundiai (BR)

(73) Assignee: Dow Global Technologies LLC, Midland, MI (US)

( * ) Notice: Subject to any disclaimer, the term of this patent is extended or adjusted under 35 U.S.C. 154(b) by 512 days.

(21) Appl. No.: 16/631,536

(22) PCT Filed: Aug. 30, 2018

(86) PCT No.: PCT/US2018/048896
§ 371 (c)(1),
(2) Date: Jan. 16, 2020

(87) PCT Pub. No.: WO2019/067155
PCT Pub. Date: Apr. 4, 2019

(65) Prior Publication Data
US 2021/0362923 A1 Nov. 25, 2021

Related U.S. Application Data

(60) Provisional application No. 62/565,351, filed on Sep. 29, 2017.

(51) Int. Cl.
*B32B 27/32* (2006.01)
*C08J 7/043* (2020.01)
(Continued)

(52) U.S. Cl.
CPC .............. *B32B 27/32* (2013.01); *B32B 27/08* (2013.01); *B65D 65/42* (2013.01); *B65D 75/008* (2013.01);
(Continued)

(58) Field of Classification Search
CPC B32B 27/32; B32B 27/08; B32B 3/02; B32B 2250/24; B32B 2255/10;
(Continued)

(56) References Cited

U.S. PATENT DOCUMENTS 6,027,776 A 2/2000 Mueller
6,383,644 B2 5/2002 Fuchs
(Continued)

FOREIGN PATENT DOCUMENTS

CA 0969820 A 6/1975
EP 2730403 A1 5/2014
(Continued)

OTHER PUBLICATIONS

MIRA-GLOS and MOR-GLOSS UV Curable Coatings, EB, Curable Coatings, Solvent-Based Two Component Polyurethane Coatings, or Waterborne Acrylic Coatings, Product Safety Assessment, The Dow Chemical Company, Feb. 4, 2014.
(Continued)

*Primary Examiner* — James C Yager

(57) ABSTRACT

The present invention provides coated films and packages formed from such films. In one aspect, a partially coated film comprises (a) a film having two outer surfaces, wherein a first outer surface is provided by a film layer that comprises from 70 to 100 percent by weight of a polyolefin having a density of 0.860 to 0.965 g/cm$^3$; and (b) a coating on the first outer surface of the film comprising polyurethane, wherein the coating covers less than 25% of the surface area of the first outer surface of the film and wherein the coated portion
(Continued)

of the film exhibits an Elmendorf tear in at least one of the machine direction or cross direction that is at least 20% less than the Elmendorf tear of the uncoated portion in the same direction, with the Elmendorf tear being measured in accordance with ASTM D1922.

14 Claims, 3 Drawing Sheets

(51) Int. Cl.
    *C08J 7/048* (2020.01)
    *C08J 7/052* (2020.01)
    *C09D 175/04* (2006.01)
    *C08J 7/04* (2020.01)
    *B65D 65/42* (2006.01)
    *B65D 75/00* (2006.01)
    *C08G 18/12* (2006.01)
    *B32B 27/08* (2006.01)
    *B65D 75/58* (2006.01)
    *C08J 5/18* (2006.01)
    *B32B 3/02* (2006.01)

(52) U.S. Cl.
CPC ......... *B65D 75/5805* (2013.01); *C08G 18/12* (2013.01); *C08J 7/042* (2013.01); *C08J 7/043* (2020.01); *C08J 7/048* (2020.01); *C08J 7/0427* (2020.01); *C08J 7/052* (2020.01); *C09D 175/04* (2013.01); *B32B 3/02* (2013.01); *B32B 2250/24* (2013.01); *B32B 2255/10* (2013.01); *B32B 2255/26* (2013.01); *B32B 2307/582* (2013.01); *B32B 2307/7244* (2013.01); *B32B 2439/40* (2013.01); *B32B 2439/70* (2013.01); *C08J 5/18* (2013.01); *C08J 2323/04* (2013.01); *C08J 2475/04* (2013.01); *Y10T 428/1352* (2015.01)

(58) Field of Classification Search
CPC .......... B32B 2255/26; B32B 2307/582; B32B 2307/7244; B32B 2439/40; B32B 2439/70; B32B 2307/7246; B32B 27/306; B32B 2307/518; B32B 7/12; B32B 27/18; B32B 27/20; B32B 27/325; B32B 27/327; B32B 27/34; B32B 2307/7248; B65D 65/42; B65D 75/008; B65D 75/5805; C08G 18/12; C08G 18/18; C08G 18/3206; C08G 18/4808; C08G 18/4825; C08G 18/7621; Y10T 428/1352; C09D 175/04; C08J 7/042; C08J 7/0427; C08J 7/043; C08J 7/048; C08J 7/052; C08J 5/18; C08J 2323/04; C08J 2475/04
See application file for complete search history.

(56) References Cited

U.S. PATENT DOCUMENTS

| | | | |
|---|---|---|---|
| 6,528,127 | B1 | 3/2003 | Edlein et al. |
| 6,642,343 | B2 | 11/2003 | Gilles et al. |
| 7,063,882 | B2 | 6/2006 | Mossbrook et al. |
| 8,133,560 | B2 | 3/2012 | Schaefer et al. |
| 9,061,536 | B2 | 6/2015 | Wiegers |
| 2003/0180541 | A1 | 9/2003 | Naik et al. |
| 2004/0062919 | A1 | 4/2004 | Kuchenmeister et al. |
| 2008/0057238 | A1 | 3/2008 | Follestad et al. |
| 2012/0010060 | A1 | 1/2012 | Fenn-Barrabass et al. |
| 2012/0033901 | A1 | 2/2012 | Votaw |
| 2013/0074454 | A1 | 3/2013 | Babrowicz |

FOREIGN PATENT DOCUMENTS

| | | |
|---|---|---|
| IN | 201303634 | 2/2014 |
| JP | 2002178462 A | 6/2002 |
| JP | 2005082671 A | 3/2005 |
| JP | 2013252645 A | 12/2013 |
| JP | 5589614 B2 | 9/2014 |
| WO | 2012/055899 A1 | 5/2012 |
| WO | 2016/196168 A1 | 12/2016 |
| WO | 2017/210087 A1 | 12/2017 |

OTHER PUBLICATIONS

MIRA-GLOS RT A&C, Adhesives and Sealants, Rohm and Haas, Apr. 2004.
PCT/US2018/048896, International Search Report and Written Opinion dated Dec. 20, 2018.
PCT/US2018/048896, International Preliminary Report on Patentability dated Apr. 9, 2020.

PARTIALLY COATED FILMS AND PACKAGES FORMED FROM SAME

FIELD

The present invention relates to partially coated films that can be used in packages. Such coated films can be particularly useful in food packages.

INTRODUCTION

Polyolefin films are commonly used to for stand-up pouches, sachets, pillow pouches, and other types of packages. Polyolefins, such as polyethylene, when used in such packages can provide good mechanical properties. While some mechanical properties may be desirable for some package designs, other mechanical properties may be less desirable. For example, packages formed from polyethylene provide high tear strength which can be desirable for some package designs. However, for package designs that are designed to be opened by tearing, high tear strength may be less desirable.

It would thus be desirable to have new films and related materials for use in packages that provide a desirable mix of mechanical properties while also permitting easy opening by tearing.

SUMMARY

The present invention provides partially coated films that advantageously combine polyolefin-based films (including monolayer and multi-layer films, with and without lamination) with a polyurethane coating on only a portion of the outer surface of the film that advantageously provide desirable mechanical properties (e.g., stiffness) while also reducing tear resistance in the coated area. The region that is coated with the polyurethane coating advantageously provides a lower tear resistance area with the ability to promote easy tear and easy puncture regions of the film, or a package formed from the film.

In one aspect, the present invention provides a partially coated film that comprises (a) a film having two outer surfaces, wherein a first outer surface is provided by a film layer that comprises from 70 to 100 percent by weight of a polyolefin having a density of 0.860 to 0.965 g/cm$^3$; and (b) a coating on the first outer surface of the film comprising polyurethane, wherein the coating covers less than 25% of the surface area of the first outer surface of the film and wherein the coated portion of the film exhibits an Elmendorf tear in at least one of the machine direction or cross direction that is at least 20% less than the Elmendorf tear of the uncoated portion in the same direction, with the Elmendorf tear being measured in accordance with ASTM D1922. In some embodiments, the film is a monolayer film. The film is a multilayer film in some embodiments.

Embodiments of the present invention also provide packages (e.g., flexible packages, pouches, stand-up pouches, bags, etc.) formed from the partially coated films disclosed herein.

These and other embodiments are described in more detail in the Detailed Description.

DETAILED DESCRIPTION

Figure 1:
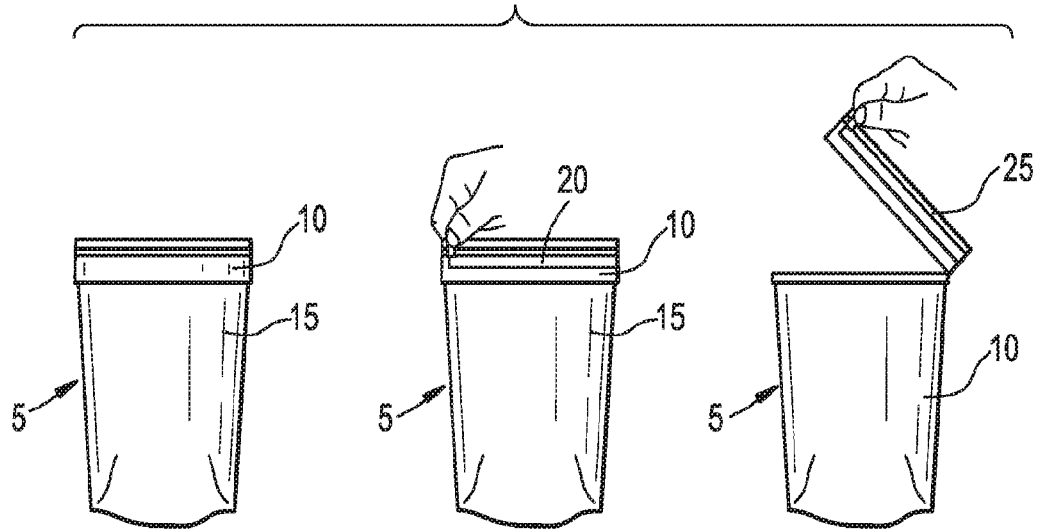
FIG. 1 illustrates the opening of a package formed from a partially coated film according to one embodiment of the present invention.

Unless specified otherwise herein, percentages are weight percentages (wt %) and temperatures are in ° C.

The term "composition," as used herein, includes material (s) which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities may be incorporated into and/or within the polymer.

The term "interpolymer," as used herein, refers to a polymer prepared by the polymerization of at least two different types of monomers. The generic term interpolymer thus includes copolymers (employed to refer to polymers prepared from two different types of monomers), and polymers prepared from more than two different types of monomers. The term "polymer", as used herein, refers to a polymeric compound prepared by polymerizing monomers, whether of the same or a different type. The generic term polymer thus embraces the term "homopolymer", usually employed to refer to polymers prepared from only one type of monomer as well as "copolymer" which refers to polymers prepared from two or more different monomers.

"Polyethylene" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single site catalyzed Linear Low Density Polyethylene, including both linear and substantially linear low density resins (m-LLDPE); Medium Density Polyethylene (MDPE); and High Density Polyethylene (HDPE). These polyethylene materials are generally known in the art;

however the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.940 g/cm$^3$.

The term "LLDPE", includes both resin made using the traditional Ziegler-Natta catalyst systems as well as single-site catalysts, including, but not limited to, bis-metallocene catalysts (sometimes referred to as "m-LLDPE") and constrained geometry catalysts, and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or 5,854,045). The LLDPEs can be made via gas-phase, solution-phase or slurry polymerization or any combination thereof, using any type of reactor or reactor configuration known in the art, with gas and slurry phase reactors being most preferred. LLDPEs typically can have a density up to 0.940 g/cm$^3$, and can include ULDPE and VLDPE which are LLDPEs having densities at the lower end of the range.

The term "MDPE" refers to polyethylenes having densities from 0.926 to 0.940 g/cm$^3$. "MDPE" is typically made using chromium or Ziegler-Natta catalysts or using metallocene, constrained geometry, or single site catalysts, and typically have a molecular weight distribution ("MWD") greater than 2.5.

The term "HDPE" refers to polyethylenes having densities of about 0.940 g/cm$^3$ or greater, which are generally prepared with Ziegler-Natta catalysts, chrome catalysts or even metallocene catalysts.

"Polypropylene" shall mean polymers comprising greater than 50% by weight of units which have been derived from propylene monomer. This includes polypropylene homopolymers or copolymers (meaning units derived from two or more comonomers). Common forms of polypropylene known in the art include homopolymer polypropylene (hPP), random copolymer polypropylene (rcPP), impact copolymer polypropylene (hPP+at least one elastomeric impact modifier) (ICPP) or high impact polypropylene (HIPP), high melt strength polypropylene (HMS-PP), isotactic polypropylene (iPP), syndiotactic polypropylene (sPP), and combinations thereof.

"Multimodal" means resin compositions which can be characterized by having at least two distinct peaks in a GPC chromatogram showing the molecular weight distribution. Multimodal includes resins having two peaks as well as resins having more than two peaks.

Unless otherwise indicated herein, the following analytical methods are used in the describing aspects of the present invention:

Melt index: Melt indices $I_2$ (or I2) and $I_{10}$ (or I10) are measured in accordance to ASTM D-1238 at 190° C. and at 2.16 kg and 10 kg load, respectively. Their values are reported in g/10 min. "Melt flow rate" is used for polypropylene based resins, and other resins, and determined according to ASTM D1238 (230° C. at 2.16 kg).

Density: Samples for density measurement are prepared according to ASTM D4703. Measurements are made, according to ASTM D792, Method B, within one hour of sample pressing.

Elmendorf tear is measured in accordance with ASTM D1922.

Peak melting point is determined by Differential Scanning calorimeter (DSC) where the film is conditioned at 230° C. for 3 minutes prior to cooling at a rate of 10° C. per minute to a temperature of 40° C. After the film is kept at −40° C. for 3 minutes, the film is heated to 200° C. at a rate of 10° C. per minute.

Secant modulus at 1% strain and at 2% strain are measured in the machine direction (MD) and cross direction (CD) with an Instron Universal tester according to ASTM D882-12.

Additional properties and test methods are described further herein.

It has been found that by applying a particular polyurethane coating in a selected region of a polyolefin film, the partially coated film has a reduced tear resistance in the coated region. By selectively coating such films, the partially coated region can thus be used to promote easy tear and/or easy puncture regions that can be particularly useful in the opening of packages formed from such films.

In one aspect, the present invention provides a partially coated film that comprises (a) a film having two outer surfaces, wherein a first outer surface is provided by a film layer that comprises from 70 to 100 percent by weight of a polyolefin having a density of 0.860 to 0.965 g/cm$^3$; and (b) a coating on the first outer surface of the film comprising polyurethane, wherein the coating covers less than 25% of the surface area of the first outer surface of the film and wherein the coated portion of the film exhibits an Elmendorf tear in at least one of the machine direction or cross direction that is at least 20% less than the Elmendorf tear of the uncoated portion in the same direction, with the Elmendorf tear being measured in accordance with ASTM D1922. In some embodiments, the Elmendorf tear of the uncoated portion of the film is at least 50 grams when measured in accordance with ASTM D1922. In some embodiments, the film is a biaxially oriented polypropylene film. The film, in some embodiments, is a cast polypropylene film. In some embodiments, the film is formed from polyethylene or blends of polyethylenes, wherein the density of the polyethylene is from 0.915 g/cm$^3$ to 0.962 g/cm$^3$.

In some embodiments, the film is a monolayer film. In other embodiments, the film is a multilayer film. In some embodiments where the film is a multilayer layer film comprising two or more layers, the film can comprise one or more layers comprising polypropylene, propylene-based copolymers, a cyclic olefin copolymer, or mixtures thereof. In some embodiments where the film is a multilayer layer film comprising two or more layers, the film can further comprise a barrier layer. A barrier layer, in such embodiments, can comprise, for example, polyamide or ethylene vinyl alcohol.

In some embodiments, the film to be coated is a blown film. The film to be coated, in some embodiments, is a cast film.

In some embodiments, the polyurethane is formed from: (a) a hydroxyl terminated urethane; and (b) an isocyanate-functional prepolymer. The isocyanate-functional prepolymer, in some embodiments, comprises an aromatic isocyanate. The hydroxyl terminated urethane comprises at least one of a hydroxyl terminated polyether-based urethane, a hydroxyl terminated polyester-based urethane, and a hydroxyl terminated polyester-polyether-based urethane, in some embodiments. Additional details regarding the polyurethane that can be used in the coating in various embodiments of the present invention are provided herein.

In some embodiments, the amount of coating on the portions of the outer surface of the film (or the outer surface of a layer of a multilayer film) that are coated is 1 to 7 g/m$^2$.

In some embodiments, the partially coated film has a thickness of 20 to 250 microns. The partially coated film has a thickness of 25 to 100 microns in some embodiments.

In some embodiments, the present invention provides laminates. In some such embodiments, a laminate comprises a partially coated film according to any of the embodiments disclosed herein laminated to a second film.

Some embodiments of the present invention relate to packages. In some such embodiments, a package comprises a partially coated film according to any of the embodiments disclosed herein. In some embodiments, the package is a standup pouch and the coated portion is proximate an upper edge of the pouch to facilitate opening of the pouch. In a further embodiment, the pouch comprises at least one side edge having a notch and the notch is formed in the coated portion or adjacent to the coated porch. In some embodiments, the package is a beverage container and the coated portion is positioned at a location on the container to permit insertion of a straw.

Films

A wide variety of films can be at least partially coated to provide partially coated films according to embodiments of the present invention.

Such films have two outer surfaces, with a first outer surface being one that is partially coated with polyurethane. The first outer surface is provided by a film layer that comprises from 70 to 100 percent by weight of a polyolefin having a density of 0.860 to 0.965 g/cm$^3$. The film layer can be the only film layer in embodiments where the film is a monolayer film, or one of a plurality of layers in embodiments where the film is a multilayer film.

As noted above, in some embodiments, the film is a multilayer film. In such embodiments, a first layer comprises from 70 to 100 percent by weight of a polyolefin having a density of 0.860 to 0.965 g/cm$^3$. The first layer is a surface layer in some embodiments that provides the first outer surface that is partially coated. All individual values and subranges from 70 to 100 percent by weight (wt %) are included herein and disclosed herein; for example the amount of the polyolefin can be from a lower limit of 70, 80, or 90 wt % to an upper limit of 80, 90, or 100 wt %. For example, the amount of the polyolefin can be from 80 to 100 wt %, or in the alternative, from 70 to 90 wt %, or in the alternative, from 75 to 95 wt %, or in the alternative from 80 to 100 wt %.

The polyolefin can be polypropylene, polyethylene, a blend of polyethylenes, or a blend of polyethylene and polypropylene, in various embodiments. In some embodiments, the film is formed from polyethylene or blends of polyethylenes, wherein the density of the polyethylene is from 0.915 g/cm$^3$ to 0.962 g/cm$^3$.

In some embodiments, the polyolefin comprises a linear low density polyethylene. The linear low density polyethylene has a density less than or equal to 0.930 g/cc (cm$^3$) in some embodiments. All individual values and subranges less than or equal to 0.930 g/cc are included herein and disclosed herein; for example, the density of the linear low density polyethylene can be from an upper limit of 0.915, 0.920, 0.925 or 0.930 g/cc In some aspects of the invention, the first linear low density polyethylene has a density greater than or equal to 0.870 g/cc. All individual values and subranges between 0.915 and 0.930 are included herein and disclosed herein.

The linear low density polyethylene has a peak melting point of 127° C. or less in some embodiments, preferably between 70 and 126° C., more preferably between 80 and 125° C.

The melt index of the linear low density polyethylene in the first layer can depend on a number of factors including whether the film is a blown film or a cast film. In embodiments where the film is a blown film, the linear low density polyethylene has an $I_2$ less than or equal to 2.0 g/10 minutes. All individual values and subranges from 2.0 g/10 minutes are included herein and disclosed herein. For example, the first linear low density polyethylene can have a melt index from an upper limit of 2.0, 1.7, 1.4, 1.1, or 0.9 g/10 minutes. In a particular aspect of the invention, the linear low density polyethylene has an $I_2$ with a lower limit of 0.1 g/10 minutes. All individual values and subranges from 0.1 g/10 minutes are included herein and disclosed herein. For example, the first linear low density polyethylene can have an $I_2$ greater than or equal to 0.1, 0.2, 0.3, or 0.4 g/10 minutes.

In other embodiments, the film can be a cast film. In such embodiments, the linear low density polyethylene has an $I_2$ greater than or equal to 2.0 g/10 minutes. All individual values and subranges above 2.0 g/10 minutes are included herein and disclosed herein. For example, the first linear low density polyethylene can have a melt index from a lower limit of 2.0, 3.0, 4.0, 5.0, 6.0, or 10 g/10 minutes. In some embodiments, the first linear low density polyethylene for a cast film application can have an upper melt index limit of 15 g/10 minutes. In some embodiments, depending on the other components in the first layer or other layers, the first linear low density polyethylene in the first layer for a cast film application can have an upper limit of $I_2$ of less than 2.0 g/10 minutes. In some embodiments, the linear low density polyethylene in the first layer for a cast film application can have a melt index ($I_2$) of 0.1-2.0 g/10 minutes, or 0.5-2.0 g/10 minutes. All individual values and subranges from 0.1 to 2.0 g/10 minutes are included herein and disclosed herein.

Examples of linear low density polyethylenes that can be used in the first layer include those commercially available from The Dow Chemical Company under the names AFFINITY™, DOWLEX™, and ELITE™ AT including, for example, AFFINITY™ PL 1146G, AFFINITY™ 1881G, DOWLEX™ 2045G, DOWLEX™ 2645G, ELITE™ AT 6401, and ELITE™ 5401G. Examples of ultra low density polyethylenes that can be used in the first layer include those commercially available from The Dow Chemical Company under the name ATTANE™ including, for example, ATTANE™ 4203.

In embodiments where the first layer comprises <100% of the first linear low density polyethylene, the first layer further comprises one or more additional polyethylene resins such as, for example, one or more low density polyethylenes having a melt index from 0.1 to 5 g/10 minutes, one or more additional linear low density polyethylenes having a density of 0.915 g/cc or more and a melt index from 0.1 to 5 g/10 minutes.

In embodiments wherein the film comprises a multilayer film, a second layer comprises from 60 to 100 percent by weight of a polyethylene in some embodiments. The second layer is another surface layer in some embodiments. All individual values and subranges from 60 to 100 percent by weight (wt %) are included herein and disclosed herein; for example the amount of the polyethylene can be from a lower limit of 60, 70, 80, or 90 wt % to an upper limit of 70, 80, 90, or 100 wt %. For example, the amount of the polyethylene can be from 70 to 100 wt %, or in the alternative, from 60 to 90 wt %, or in the alternative, from 65 to 95 wt %, or in the alternative from 70 to 100 wt %.

The polyethylene in the second layer has a density of 0.905 to 0.970 g/cc (cm$^3$). All individual values and subranges from 0.910 to 0.970 g/cc are included herein and disclosed herein; for example, the density of the polyethylene can be from a lower limit of 0.905, 0.910, 0.920, 0.930, 0.940, or 0.950 g/cc to an upper limit of 0.930, 0.940, 0.950, 0.960, 0.970 g/cc. In some embodiments, the polyethylene has a density from 0.910 to 0.970 g/cc, preferably between 0.920 to 0.960 g/cc, more preferably between 0.940 to 0.960 g/cc.

The polyethylene in the second layer has a peak melting point of 100° C. to 135° C. in some embodiments, preferably between 102 and 132° C., more preferably between 105 and 132° C.

The melt index of the polyethylene in the second layer can depend on a number of factors including whether the film is a blown film or a cast film. In embodiments where the film is a blown film, the polyethylene has an $I_2$ less than or equal to 2.0 g/10 minutes. All individual values and subranges from 2.0 g/10 minutes are included herein and disclosed herein. For example, the polyethylene can have a density from an upper limit of 2.0, 1.7, 1.4, 1.1, or 0.9 g/10 minutes. In a particular aspect of the invention, the polyethylene has an $I_2$ with a lower limit of 0.1 g/10 minutes. All individual values and subranges from 0.1 g/10 minutes are included herein and disclosed herein. For example, the polyethylene can have an $I_2$ greater than or equal to 0.1, 0.2, 0.3, or 0.5 g/10 minutes.

In other embodiments, the film can be a cast film. In such embodiments, the polyethylene in the second layer has an $I_2$ greater than or equal to 2.0 g/10 minutes. All individual values and subranges above 2.0 g/10 minutes are included herein and disclosed herein. For example, the first linear low density polyethylene can have a melt index from a lower limit of 2.0, 3.0, 4.0, 5.0, 6.0, or 10 g/10 minutes. In some embodiments, the polyethylene in the second layer for a cast film application can have an $I_2$ of up to 15 g/10 minutes. In some embodiments, depending on the other components in the second layer or other layers, the polyethylene in the second layer for a cast film application can have an upper limit of $I_2$ of less than 2.0 g/10 minutes. In some embodiments, the polyethylene in the second layer for a cast film application can have a melt index ($I_2$) of 0.1-2.0 g/10 minutes, or 0.5-2.0 g/10 minutes. All individual values and subranges from 0.1 to 2.0 g/10 minutes are included herein and disclosed herein.

Examples of polyethylenes that can be used in the second layer include those commercially available from The Dow Chemical Company under the names DOWLEX™ and ELITE™, and ATTANE™, such as DOWLEX™ 2045G, DOWLEX™ NG2038B, ELITE™ 5111G, ELITE™ 5400G, ELITE™ 5960G, and ATTANE 4203.

In embodiments where the second layer comprises <100% of the polyethylene described above, the second layer further comprises one or more additional polyethylene resins such as, for example, one or more low density polyethylenes having a melt index from 0.1 to 5 g/10 minutes, one or more additional linear low density polyethylenes having a density of 0.950 g/cc or less and a melt index from 0.1 to 5 g/10 minutes. In embodiments wherein the film comprises a multilayer film, a second layer comprises from 60 to 100 percent by weight of a polypropylene. The second layer is another surface layer in some embodiments. All individual values and subranges from 60 to 100 percent by weight (wt %) are included herein and disclosed herein; for example the amount of the polypropylene can be from a lower limit of 60, 70, 80, or 90 wt % to an upper limit of 70, 80, 90, or 100 wt %. For example, the amount of the polypropylene can be from 70 to 100 wt %, or in the alternative, from 60 to 90 wt %, or in the alternative, from 65 to 95 wt %, or in the alternative from 70 to 100 wt %.

The polypropylene that can be used in the second layer can be homopolymer polypropylene (hPP), random copolymer polypropylene (rcPP), impact copolymer polypropylene (hPP+at least one elastomeric impact modifier) (ICPP) or high impact polypropylene (HIPP), high melt strength polypropylene (HMS-PP), isotactic polypropylene (iPP), syndiotactic polypropylene (sPP), and combinations thereof. Examples of homopolymer propylenes that can be used in some embodiments of the present invention include homopolymer propylenes commercially available from LyondellBasell Industries (e.g., Pro-fax PD702), from Braskem (e.g., D115A), and from Borealis (e.g., WF 420HMS). The polypropylene that can be used in the second layer can also be a propylene-alpha-olefin interpolymer. Such propylene/alpha-olefin interpolymers are commercially available from The Dow Chemical Company, under the trade name VERSIFY™, or from ExxonMobil Chemical Company, under the trade name VISTAMAXX.

In embodiments where the second layer comprises <100% of the polypropylene described above, the second layer further comprises one or more polyethylene resins such as, for example, one or more low density polyethylenes having a melt index from 0.1 to 5 g/10 minutes, one or more additional linear low density polyethylenes having a density of 0.930 g/cc or less and a melt index from 0.1 to 5 g/10 minutes.

In embodiments wherein the film is a multilayer film having first and second layers as described above, the film can further comprise one or more inner layers between the first layer and the second layer. In such embodiments, at least one of the inner layers can comprise from 40 to 100 percent by weight of a high density polyethylene. All individual values and subranges from 40 to 100 percent by weight (wt %) are included herein and disclosed herein; for example the amount of the high density polyethylene can be from a lower limit of 40, 50, 60, 70, 80, or 90 wt % to an upper limit of 50, 60, 70, 80, 90, or 100 wt %. For example, the amount of the high density polyethylene can be from 50 to 100 wt %, or in the alternative, from 60 to 90 wt %, or in the alternative, from 65 to 95 wt %, or in the alternative from 70 to 100 wt %.

The high density polyethylene has a density of 0.930 g/cc (cm$^3$) to 0.970 g/cc. All individual values and subranges from 0.930 to 0.970 g/cc are included herein and disclosed herein; for example, the density of the polyethylene can be from a lower limit of 0.930, 0.940, 0.950, or 0.960 g/cc to an upper limit of 0.950, 0.960, or 0.970 g/cc. In some embodiments, the high density polyethylene has a density of 0.940 g/cc or more.

The high density polyethylene has a peak melting point of 126° C. to 135° C. in some embodiments, preferably between 126 and 132° C., more preferably between 127 and 132° C.

The melt index of the high density polyethylene in the at least one inner layer can depend on a number of factors including whether the film is a blown film or a cast film. In embodiments where the film is a blown film, the high density polyethylene has an $I_2$ less than or equal to 2.0 g/10 minutes. All individual values and subranges from 2.0 g/10 minutes are included herein and disclosed herein. For example, the high density polyethylene can have a density from an upper limit of 2.0, 1.7, 1.4, 1.1, or 0.9 g/10 minutes. In a particular aspect of the invention, the high density polyethylene has an $I_2$ with a lower limit of 0.1 g/10 minutes. All individual values and subranges from 0.1 g/10 minutes are included herein and disclosed herein. For example, the high density polyethylene can have an $I_2$ greater than or equal to 0.1, 0.2, 0.3, or 0.4 g/10 minutes.

In other embodiments, the film can be a cast film. In such embodiments, the high density polyethylene has an $I_2$ greater than or equal to 2.0 g/10 minutes. All individual values and subranges above 2.0 g/10 minutes are included herein and disclosed herein. For example, the high density polyethylene in the at least one inner layer can have a melt index from a lower limit of 2.0, 3.0, 4.0, 5.0, 6.0, or 10 g/10 minutes. In some embodiments, the high density polyethylene in the at least one inner layer for a cast film application can have an $I_2$ of up to 15 g/10 minutes. In some embodiments, depending on the other components in the inner layer(s) or other layers, the high density polyethylene in the at least one inner layer for a cast film application can have an upper limit of $I_2$ of less than 2.0 g/10 minutes.

In some embodiments, the high density polyethylene in the at least one inner layer for a cast film application can have a melt index ($I_2$) of 0.1-2.0 g/10 minutes, or 0.5-2.0 g/10 minutes. All individual values and subranges from 0.1 to 2.0 g/10 minutes are included herein and disclosed herein.

Examples of high density polyethylenes that can be used in the at least one inner layer include those commercially available from The Dow Chemical Company under the names DOWLEX™ and ELITE™, such as ELITE™ 5940G, and ELITE™ 5960G. In some embodiments, a medium density polyethylene can be used in the inner layer instead of, or in addition to a high density polyethylene. An example of such a medium density polyethylene is DOWLEX™ 2038.68G from The Dow Chemical Company.

In embodiments where an inner layer comprises <100% of the polyethylene described above, the inner layer further comprises one or more additional polyethylene resins such as, for example, one or more low density polyethylenes having a melt index from 0.1 to 5 g/10 minutes, one or more additional linear low density polyethylenes having a density of 0.930 g/cc or less and a melt index from 0.1 to 5 g/10 minutes.

In addition to an inner layer comprising 40 to 100 percent by weight of a high density polyethylene, in some embodiments, the film can comprise one or more additional inner layers comprising other polyethylenes or combinations of polyethylenes, such as one or more low density polyethylenes, one or more linear low density polyethylenes, or combinations thereof. For example, in one embodiment, the film comprises at least one additional inner layer wherein the additional inner layer comprises 50 to 100 weight percent of a polyethylene having a density of 0.920 g/cc (cm³) or less. All individual values and subranges for a density of polyethylene from 0.920 g/cc are included herein and disclosed herein; for example, the density of the polyethylene can be to an upper limit of 0.900, 0.905, 0.910, 0915, or 0.920 g/cc. Such inner layers can be provided, for example, to enhance the strength of the film.

The melt index of the polyethylene in the at least one additional inner layer can depend on a number of factors including whether the film is a blown film or a cast film. In embodiments where the film is a blown film, the polyethylene in the at least one additional layer has an $I_2$ less than or equal to 2.0 g/10 minutes. All individual values and subranges from 2.0 g/10 minutes are included herein and disclosed herein. For example, the polyethylene can have a density from an upper limit of 2.0, 1.7, 1.4, 1.1, or 0.9 g/10 minutes. In a particular aspect of the invention, the polyethylene has an $I_2$ with a lower limit of 0.01 g/10 minutes. All individual values and subranges from 0.1 g/10 minutes are included herein and disclosed herein. For example, the polyethylene can have an $I_2$ greater than or equal to 0.1, 0.2, 0.3, or 0.4 g/10 minutes.

In other embodiments, the film can be a cast film. In such embodiments, the polyethylene in the at least one additional inner layer has an $I_2$ greater than or equal to 2.0 g/10 minutes. All individual values and subranges above 2.0 g/10 minutes are included herein and disclosed herein. For example, the polyethylene can have a melt index from a lower limit of 2.0, 3.0, 4.0, 5.0, 6.0, or 10 g/10 minutes. In some embodiments, the polyethylene in the at least one additional inner layer for a cast film application can have an $I_2$ of up to 15 g/10 minutes. In some embodiments, depending on the other components in the inner layer(s) or other layers, the polyethylene in the at least one additional inner layer for a cast film application can have an upper limit of $I_2$ of less than 2.0 g/10 minutes. In some embodiments, the polyethylene in the at least one additional inner layer for a cast film application can have a melt index ($I_2$) of 0.1-2.0 g/10 minutes, or 0.5-2.0 g/10 minutes. All individual values and subranges from 0.1 to 2.0 g/10 minutes are included herein and disclosed herein.

Examples of polyethylenes having a density of 0.920 g/cc or less that can be used in the at least one additional inner layer include those commercially available from The Dow Chemical Company under the names DOWLEX™, ELITE™, and ATTANE™, such as DOWLEX™ 2045G, ELITE™ 5401G, and ATTANE™ 4203G.

In any of the above layers (but preferably in the inner layers) of a multilayer film, other polyolefin resins can be included in addition to the polyethylene for a variety of reasons. For example, a layer in a multilayer film can comprise other polyolefin resins, such as polypropylene and/or cyclic olefin copolymers (e.g., cyclic olefin copolymers commercially available from TOPAS Advance polymers such as TOPAS 6013), to provide increased stiffness without significant harm to the compatibility among materials and potential recyclability. In such embodiments, the additional polyolefin resins can be provided in amounts less than 50 weight percent.

In some embodiments, a multilayer film that can be used in partially coated films of the present invention can comprise 3 or more layers. A multilayer film that can be used in partially coated films of the present invention can comprise up to 7 layers in some embodiments. The number of layers in the film can depend on a number of factors including, for example, the desired thickness of the multilayer film, the desired properties of the multilayer film, the intended use of the multilayer film, and other factors.

In some embodiments, depending on the desired use or requirements of the film, the film can comprise other layers such as barrier layers. For example, for some uses, it may be desirable for the film to provide a barrier to moisture, light, aroma/odor, and/or oxygen transmission. Such barrier layers can include, for example, polyamide films, ethylene vinyl alcohol films, and other layers as known to those of skill in the art. In such embodiments, one or more tie layers may be included in the film to adhere the barrier layer(s) to the polyethylene-based layer(s).

In some embodiments, one or more layers in multilayer film can comprise one or more additives. Additives can include, but are not limited to, antistatic agents, color enhancers, dyes, lubricants, fillers (for example, TiO2 or CaCO3), opacifiers, nucleators, processing aids, pigments, primary anti-oxidants, secondary anti-oxidants, UV stabilizers, anti-blocks, slip agents, tackifiers, fire retardants, anti-microbial agents, odor reducer agents, anti-fungal agents, oxygen scavengers, moisture scavengers, and combinations thereof, depending on the requirements of a particular application.

In some embodiments, a film to be partially coated with the polyurethane coating comprises a monolayer film. Such films have two outer surfaces, with a first outer surface being one that is partially coated with polyurethane. The first outer surface is provided by a film layer that comprises from 70 to 100 percent by weight of a polyolefin having a density of 0.860 to 0.965 g/cm$^3$.

The monolayer film comprises from 70 to 100 percent by weight of a polyolefin having a density of 0.860 to 0.965 g/cm$^3$. All individual values and subranges from 70 to 100 percent by weight (wt %) are included herein and disclosed herein; for example the amount of the polyolefin can be from a lower limit of 70, 80, or 90 wt % to an upper limit of 80, 90, or 100 wt %. For example, the amount of the polyolefin can be from 80 to 100 wt %, or in the alternative, from 70 to 90 wt %, or in the alternative, from 75 to 95 wt %, or in the alternative from 80 to 100 wt %.

In some embodiments, the monolayer film is a biaxially oriented polypropylene film.

The monolayer film, in some embodiments, is a cast polypropylene film.

In some embodiments, the monolayer film comprises from 70 to 100 percent by weight polyethylene having a density of 0.860 to 0.965 g/cm$^3$. In some embodiments, the monolayer film comprises from 70 to 100 percent by weight polyethylene having a density of 0.915 to 0.962 g/cm$^3$.

In some embodiments, the monolayer film comprises from 70 to 100 percent by weight polyethylene having a density less than 0.930 g/cm$^3$ and a melt index ($I_2$) of less than 2.0 g/10 minutes, and a peak melting point of less than 126° C. All individual values and subranges from 70 to 100 percent by weight (wt %) are included herein and disclosed herein; for example the amount of the polyethylene can be from a lower limit of 70, 80, or 90 wt % to an upper limit of 80, 90, or 100 wt %. For example, the amount of the polyethylene can be from 80 to 100 wt %, or in the alternative, from 70 to 90 wt %, or in the alternative, from 75 to 95 wt %, or in the alternative from 80 to 100 wt %.

The polyethylene used in the monolayer has a density less than or equal to 0.965 g/cc (cm$^3$) in some embodiments. All individual values and subranges less than or equal to 0.965 g/cc are included herein and disclosed herein; for example, the density of the polyethylene can be from an upper limit of 0.950, 0.940, 0.930 or 0.910 g/cc. In some aspects of the invention, the polyethylene has a density greater than or equal to 0.870 g/cc. All individual values and subranges between 0.870 and 0.930 g/cc are included herein and disclosed herein.

The polyethylene used in the monolayer has a peak melting point of 135° C. or less in some embodiments, preferably between 100 and 132° C., more preferably between 105 and 131° C.

The melt index of the polyethylene used in the monolayer ($I_2$) is less than or equal to 2.0 g/10 minutes in some embodiments. All individual values and subranges from 2.0 g/10 minutes are included herein and disclosed herein. For example, the polyethylene can have a density from an upper limit of 2.0, 1.7, 1.4, 1.1, or 0.9 g/10 minutes. In a particular aspect of the invention, the polyethylene has an $I_2$ with a lower limit of 0.1 g/10 minutes. All individual values and subranges from 0.1 g/10 minutes are included herein and disclosed herein. For example, the polyethylene can have an $I_2$ greater than or equal to 0.1, 0.2, 0.3, or 0.4 g/10 minutes.

Examples of polyethylenes having a density of 0.930 g/cc or less, a melt index ($I_2$) of 2.0 g/10 minutes or less, and a peak melting point of 126° C. or less that can be used in a monolayer film according to some embodiments include those commercially available from The Dow Chemical Company under the names AFFINITY™, ELITE™ AT, and ATTANE™, such as AFFINITY™ PL 1146G, AFFINITY™ 1888, ELITE™ AT 6401, ELITE™ 5401G, and ATTANE™ 4203.

In the case of a monolayer film, other polyolefin resins can be included in the monolayer in addition to the polyethylene for a variety of reasons. For example, the monolayer can comprise polyolefin resins, such as polypropylene and/or cyclic olefin copolymers (e.g., cyclic olefin copolymers commercially available from TOPAS Advance polymers such as TOPAS 6013), to provide increased stiffness. In such embodiments, the additional polyolefin resins can be provided in amounts less than 50 weight percent.

In embodiments where the monolayer comprises <100% of the polyethylene described above, the monolayer further comprises one or more additional polyethylene resins such as, for example, one or more low density polyethylenes having a melt index from 0.1 to 5 g/10 minutes, one or more additional linear low density polyethylenes having a density of 0.930 g/cc or less and a melt index from 0.1 to 5 g/10 minutes.

In some embodiments, one or more layers in a monolayer film can comprise one or more additives. Additives can include, but are not limited to, antistatic agents, color enhancers, dyes, lubricants, fillers (for example, TiO2 or CaCO3), opacifiers, nucleators, processing aids, pigments, primary anti-oxidants, secondary anti-oxidants, UV stabilizers, anti-blocks, slip agents, tackifiers, fire retardants, anti-microbial agents, odor reducer agents, anti-fungal agents, oxygen scavengers, moisture scavengers, and combinations thereof, depending on the requirements of a particular application.

In some embodiments, the monolayer films or multilayer films that can be used in partially coated films of the present invention are characterized by their Elmendorf tear strength prior to coating. In some embodiments, the Elmendorf tear of the uncoated portion of the film is at least 50 grams when measured in accordance with ASTM D1922. It is preferred that the films used in embodiments of the present invention be formed in a blown film or cast film process as is generally known in the art, although other methods such as lamination can be used.

Polyurethane Coating

The present invention provides a polyurethane-based coating on only a portion of the outer surface of the film. By only coating a portion of the film, the partially coated film provides an easy tear and/or easy puncture region in the coated portion. This can be particularly useful in the opening of packages formed from such films. Accordingly, only selected regions of the film are coated with the polyurethane. Thus, the uncoated portions of the film may advantageously have higher tear and/or puncture resistance, which can be beneficial for packages formed from the film, while providing easy open functionality in the coated portion.

In some embodiments, the coating covers less than 25% of the surface area of the first outer surface of the film. The coating covers less than 20% of the surface area of the first outer surface of the film in some embodiments. The coating, in some embodiments, covers less than 15% of the surface area of the first outer surface of the film. The coating, in other embodiments, covers less than 10%, 9%, 8%, 7%, 6%, 5%, 4%, 3%, 2%, or 1% of the surface area of the first outer surface of the film.

In the case of a multilayer film, the outer surface is the outer surface of the film layer that comprises from 70 to 100 percent by weight of a polyolefin having a density of 0.860 to 0.965 g/cm$^3$. In the case of a monolayer film, the polyurethane-based coating is partially coated on one of the outer surfaces of the film.

The term "polyurethane-based coating" is used to indicate that upon curing, the coating comprises primarily polyurethane but that the coating may also include, in some embodiments, unreacted reactants (e.g., polyols, isocyanates, etc.) as well as other additives.

In some embodiments, the polyurethane is formed from: (a) a hydroxyl terminated polyol or urethane; and (b) an isocyanate-functional prepolymer. The isocyanate-functional prepolymer, in some embodiments, comprises an aromatic isocyanate. Examples of aromatic isocyanates that can be used in some embodiments of the present invention include any or all isomers of toluene diisocyanate (TDI) and/or any or all isomers of methylene diphenyl diisocyanate (MDI). In some embodiments, the isocyanate-functional prepolymer comprises an aliphatic isocyanate. Examples of aliphatic isocyanates that can be used in some embodiments of the present invention include any and all isomers of isophorone diisocyanate (IPDI), any and all isomers of hexamethylene diisocyanate (HDI), any and all isomers of xylylene diisocyanate (XDI), any and all isomers of hydrogenated xylylene diisocyanate (H6XDI), and any and all isomers of meta-tetramethylxylylene diisocyanate (TMXDI). The hydroxyl terminated urethane comprises at least one of a hydroxyl terminated polyether-based urethane, a hydroxyl terminated polyester-based urethane, and a hydroxyl terminated polyester-polyether-based urethane, in some embodiments.

The polyurethane may be formed by mixing together two separate components at a prescribed mixing ratio and then curing upon reaction between the two components. In some embodiments, the two reactant components can be prepared so as to provide a mixing ratio of 1:1 (ratio of hydroxyl terminated polyol or urethane to isocyanate-functional prepolymer) to facilitate measuring and mixing. In some embodiments, such mixing ratio can be in the range from 1:0.2 to 1:2. At such mixing ratios, in some embodiments, the isocyanate index is in the range from ~1:1 to ~3:3. In some embodiments, the polyurethane may be a one-component isocyanate terminated prepolymer that reacts with ambient moisture or humidity to complete its cure.

The polyurethane components may be comprised of polyether polyols, polyester polyols, or a combination of both. Such polyols can be linear or branched in some embodiments. Polyesters with aromatic components can be used to impart alternative performance properties such as chemical or heat resistance for a targeted application in some embodiments. In some embodiments, the coating is formed from polyols having molecular weights between 100 and 4700 Daltons and using multifunctional reagents that impart branching such as triisopropanolamine and trimethylolpropane. Such selected materials, when reacted together and combined with certain non-reactive additives, can advantageously provide desirable reductions in tear resistance in the coated portion(s) of partially coated films in accordance with some embodiments of the present invention.

The coating can be applied to only a portion (e.g., less than 25% of the surface area) of the outer surface of the film using a variety of techniques by which coatings are typically applied to films including, but not limited to, for example, gravure coating, flexographic coating, and offset printing. Other thin coating techniques may also be used. Persons of skill in the art with equipment to apply solvent-based and/or water-based coatings and adhesives can readily adapt their process to apply a polyurethane coating to a film to obtain the partially coated films of the present invention wherein the coating is applied to 25% or less of the surface area of an outer surface of the film. To achieve adequate dynamic viscosity, the target solids at application will depend on the particular coating, but in some embodiments, can be in range of 15% to 80%.

In some embodiments, the surface of the film to be partially coated can be corona treated prior to application of the coating using techniques known to those of skill in the art based on the teachings herein.

The amount of coating applied to the film, in some embodiments, can be at least 1 gram per square meter. As used herein, the amount of coating is determined by measuring the difference of the weight of the film before coating and after the coating is applied and dried. In some embodiments, the amount of coating applied to the film is up to 7 grams per square meter. The amount of coating applied to the film, in some embodiments, is 1 to 7 grams per square meter. All individual values and subranges from 1 to 7 grams per square meter are included herein and disclosed herein; for example, the amount of coating may be from a lower limit of 1, 2, 3, 4, 5, or 6 grams per square meter to an upper limit of 2, 3, 4, 5, 6, or 7 grams per square meter. In some embodiments, the amount the amount of coating is from 2 to 4 grams per square meter in some embodiments.

As discussed earlier, various embodiments of partially coated films of the present invention can have one or more desirable properties including, for example, a low tear resistance in the portion of the film that is partially coated, a low puncture resistance in the portion of the film that is partially coated, and/or other properties.

Partially coated films, according to some embodiments of the present invention, have an Elmendorf tear value in at least one of the machine direction or cross direction that is at least 20% less than the Elmendorf tear of the uncoated portion in the same direction, with the Elmendorf tear being measured in accordance with ASTM D1922. In some embodiments, the Elmendorf tear in both the machine direction and cross direction are each at least 20% less than the Elmendorf tear of the uncoated portion in the corresponding directions, with the Elmendorf tear being measured in accordance with ASTM D1922. In some embodiments, the Elmendorf tear of the uncoated portion of the film is at least 50 grams when measured in accordance with ASTM D1922.

Embodiments of the present invention also relate to laminates, wherein the laminate comprises the partially coated film according to any of the inventive embodiments described herein. The partially coated film can be laminated to another film either before or after the coating is applied to a portion of its outer surface. Various methods known to those of skill in the art can be used to laminate a partially coated film of the present invention to another film. For example, and without limitation, a solventless adhesive may be utilized as part of a dry lamination process. Suitable commercially available solventless adhesives include, for example and without limitation, MOR-FREE™ from The Dow Chemical Company.

A variety of different laminates can be formed depending, for example, on the intended use of the film. For example, if the laminate is going to be used to form a package, the size of the package, the type of package, the desired appearance of the package, the contents of the package, and other factors can be important in selecting the film used to form the partially coated film of the present invention as well as the film to which it will be laminated. The other film can be a monolayer film or a multilayer film again depending on a variety of factors such as those set out above. In some embodiments, the partially coated film of the present invention is a polyethylene film and is laminated to another polyethylene film. In some embodiments, the partially coated film of the present invention is a polypropylene film and is laminated to a polyethylene film. In some embodiments, the partially coated film of the present invention is a polyethylene film and is laminated to a polypropylene film. In some embodiments, the partially coated film of the present invention is a polypropylene film and is laminated to another polypropylene film. In some embodiments, neither of the films that are laminated to each other are oriented.

Embodiments of the present invention also relate to articles formed from any of the partially coated films disclosed herein. In some embodiments, the article is a package. In some embodiments, the package comprises a first partially coated film according to the present invention and a second partially coated film according to the present invention. In some embodiments, the package comprises a partially coated film according to the present invention and a second film. In some embodiments, the partially coated film according to the present invention is heat sealed using a heat sealable side or surface (e.g., the surface that is not partially coated) to another heat sealable surface, whether a film or a sheet or a formed container of any suitable construction. Alternatively, the package can be formed from a single partially coated film of the present invention that is folded, formed, and heat sealed.

In some embodiments, the package is in the form of one or more of the following: a pouch, a sachet, a stand up pouch, a tray with a lid formed from the partially coated film, a pillow pouch with designed tear areas and others. Such packages can be formed using techniques known to those of skill in the art based on the disclosure herein.

In some embodiments, the package can be designed such that the coated portion of the partially coated film is positioned to facilitate opening of the package by a consumer or user.

FIG. 1 illustrates the opening of a package in the form of a stand-up pouch 5. The pouch 5 is formed from a partially coated film according to an embodiment of the present invention. The pouch 5 includes a coated portion 10 that is coated with a polyurethane coating and an uncoated portion 15. The coated portion 10 is proximate an upper edge of the pouch 5 to facilitate opening of the pouch. The coated portion 10 is scored 20 along the coated portion 10 to provide a guide for a user to open the pouch 5. Due to the lower tear strength of the coated portion 10, the user can more easily open the pouch 5. A top portion 25 of the pouch is removed for the user to access the contents of the pouch 5. While not shown in FIG. 1, a notch can be formed on a side edge of the pouch 5 to facilitate initiation of the tear to remove the top portion 25.

Figure 2:
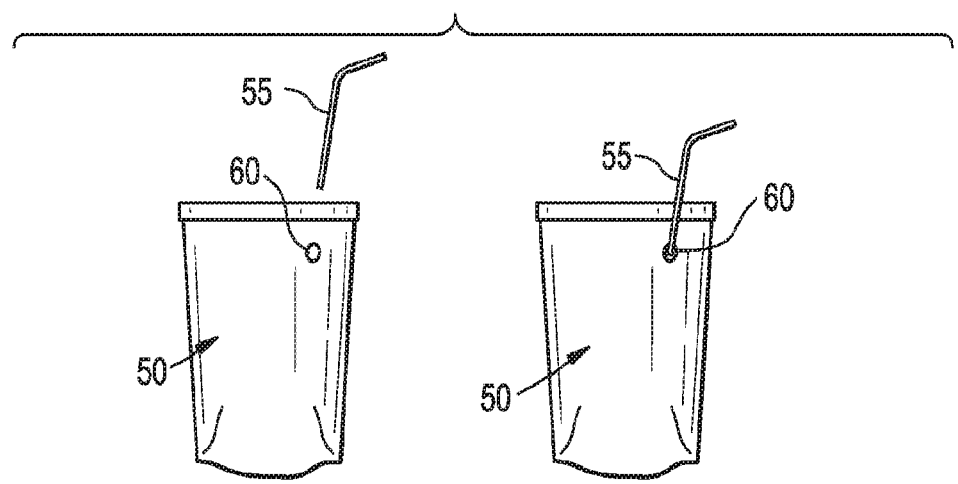
FIG. 2 illustrates the puncturing of a beverage container formed from a partially coated film according to one embodiment of the present invention.

FIG. 2 illustrates the insertion of a straw 55 into a beverage container 50. The beverage container 50 is a pouch type container formed from a partially coated film according to an embodiment of the present invention. In the embodiment shown, the coated portion 60 that is coated with a polyurethane coating is only a small circular region at a location where the straw 55 is to be inserted. Due to the lower puncture or tear strength of the coated portion 60, the user can easily insert the straw 55 to access the beverage in the container 60.

Figure 3:
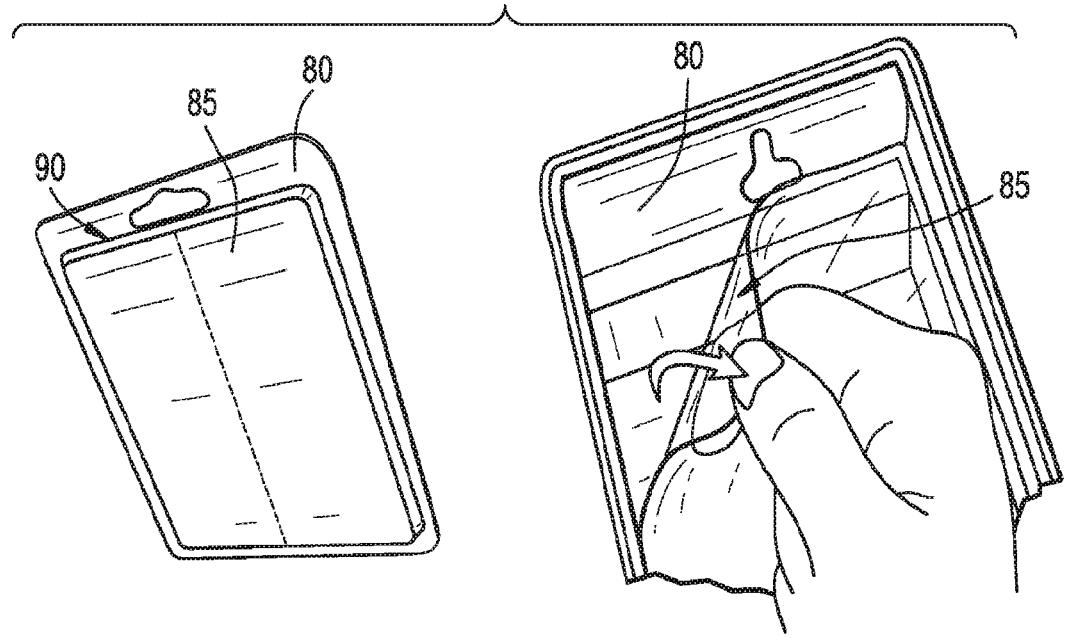
FIG. 3 illustrates the opening another package formed from a partially coated film according to one embodiment of the present invention.

FIG. 3 illustrates the opening of a package in the form of a tray 80 with a lid 85. The tray 80 is a thermoformed film in the embodiment shown but could also be constructed from other materials. The lid 85 is formed from a partially coated film according to an embodiment of the present invention. The lid 85 includes a coated portion 90 that is coated with a polyurethane coating. The coated portion 90 extends around the perimeter of the lid 85 to facilitate removal of the lid 85 from the tray 80. Due to the lower tear strength of the coated portion 90, the user can more easily remove the lid 85 from the tray 80.

Figure 4:
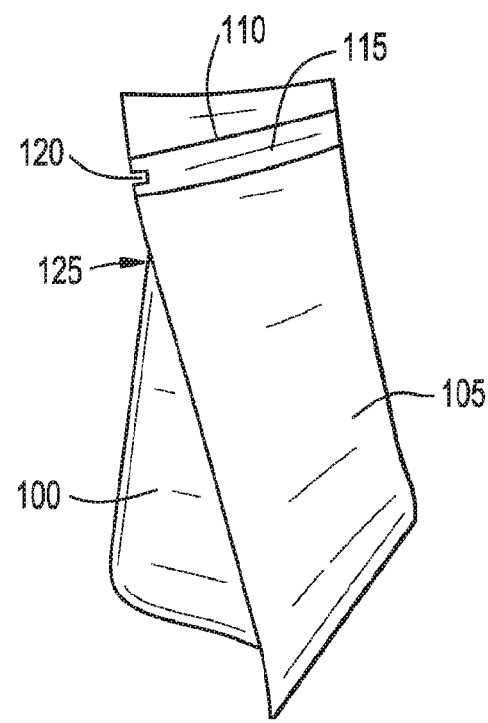
FIG. 4 illustrates another embodiment of a package formed from a partially coated film according to one embodiment of the present invention.

FIG. 4 illustrates another embodiment of a package in the form of a tray 100 with a lid 105. In this embodiment, the package is designed to be opened by removing a top portion 110 of the package. Accordingly, the coated portion 115 with the polyurethane coating extends across the top portion 110 of the package. A notch 120 is provided on a side edge 125 of the tray 100 to facilitate initiation of the tear to remove the top portion 110.

The thickness of the partially coated film used to form the package can be selected depending on a number of factors including, for example, the size of the package, the volume of the package, the contents of the package, the desired properties of the package, and other factors. In some such embodiments, the partially coated film has a thickness used in a package of the present invention has a thickness of 20 to 200 microns. All individual values and subranges from 20 to 200 microns are included herein and disclosed herein; for example, the thickness of the partially coated film may be from a lower limit of 20, 30, 40, 50, 60, 70, 80, 90, 100, 110, 120, 130, 140, 150, 160, 170, 180, or 190 microns to an upper limit of 30, 40, 50, 60, 70, 80, 90, 100, 110, 120, 130, 140, 150, 160, 170, 180, 190, or 200 microns. In some embodiments, the partially coated film has a thickness of 25 to 100 microns.

Non-limiting examples of contents suitable for containment by packages of the present invention include comestibles (beverages, soups, cheeses, cereals), liquids, shampoos, oils, waxes, emollients, lotions, moisturizers, medicaments, pastes, surfactants, gels, adhesives, suspensions, solutions, enzymes, soaps, cosmetics, liniments, flowable particulates, and combinations thereof.

Some embodiments of the invention will now be described in detail in the following Examples.

EXAMPLES

Example 1

Preparation of Reactant Compositions for Polyurethane Coating

Some of the following Examples include a monolayer film coated with a polyurethane coating according to an embodiment of the present invention. The polyurethane coating (PU Coating 1) used in these Examples can be prepared from two reactant compositions as follows.

Reactant Composition A comprises a hydroxyl terminated urethane and is prepared from the following ingredients:

| Ingredient | Description | Amount (wt %) |
|---|---|---|
| ethyl acetate | Solvent from UNIVAR, Inc. | 26.5861 |
| Triisopropylanolamine (TIPA) | TIPA (99%) from The Dow Chemical Company | 20.2901 |
| monomeric toluene diisocyanate (TDI) | Mondur TD-80 Grade B from Bayer Material Science | 17.8299 |
| polyether diol | polyether diol (nominal molecular weight of 425) from The Dow Chemical Company | 13.8618 |
| polyether polyol | VORANOL 220-110N from The Dow Chemical Company | 21.4276 |
| antifoam | SAG-47 from Momentive Performance Materials | 0.0046 |

To prepare Reactant Composition A, the TIPA is melted. The polyether diol (nominal molecular weight of 425) is vacuum loaded into a reactor. The melted TIPA is vacuum loaded into the reactor, followed by the polyether polyol (VORANOL 220-110N). The vacuum lines are rinsed with ethyl acetate and the contents of the reactor are stirred at 75 RPM. Ethyl acetate is vacuum loaded into the reactor. The contents of the reactor are cooled via a cooling jacket. After cooling, the TDI is loaded to the reactor, and the vacuum lines are rinsed with ethyl acetate. Because of the exothermic nature of the reaction, the contents of the reactor are cooled to a temperature of 75° C. The temperature in the reactor is held at 75° C. under agitation for 4 hours. The contents of the reactor are then cooled to 60° C., and the viscosity is measured. If the viscosity is <2500 cP, the contents of the reactor are cooled to 40° C., and 0.393 weight percent TDI (based on the original TDI charge) is added, and the mix tank contents are heated and held at 75° C. for one hour. If the viscosity is >2500 cP, a mixture of the antifoam and the remaining ethyl acetate are vacuum loaded to the reactor. The contents are then stirred for 30 minutes. The reactor is then cooled to 50° C., and the Reactant Composition A is packaged for use.

Reactant Composition B comprises an isocyanate-functional prepolymer and is prepared from the following ingredients:

| Ingredient | Description | Amount (wt. %) |
|---|---|---|
| ethyl acetate | Solvent from UNIVAR, Inc. | 24.049 |
| Trimethylolpropane | Trimethylolpropane from Lanxess Corp. | 11.480 |
| monomeric toluene diisocyanate (TDI) | Mondur TD-80 Grade B from Bayer Material Science | 43.612 |
| Additive | Synaceti 125 from Werner G. Smith, Inc. | 1.191 |
| Lubricant | Refined corn oil from Cargill Inc. | 1.191 |
| cyclohexane | Cyclohexane from UNIVAR, Inc. | 18.423 |
| benzoyl chloride | benzoyl chloride from Aldrich Chemical Co. | 0.055 |

To prepare Reactant Composition B, the Additive and the Lubricant are premixed and held at 50° C. The trimethylolpropane is loaded to the reactor followed by ethyl acetate. The TDI is vacuum loaded to the reactor followed by the remainder of the ethyl acetate as a rinse. The batch is held at 70° C. for 3 hours. The batch is then cooled to 55° C. The viscosity of the batch is measured. If the viscosity is <380 cP, the viscosity of the batch is adjusted to >380 cP by adding trimethylolpropane. If the viscosity is >380 cP, or after the additional trimethylolpropane is added, the reactor is then cooled to 55° C. The premixed Additive/Lubricant are vacuum loaded to the reactor. The cyclohexane is then added to the reactor, and the contents are held at 45° C. and stirred 45 minutes until the contents are clear (e.g., Additive must be dissolved). The benzoyl chloride is then vacuum loaded to the reactor, and the contents are stirred for 15 minutes. Reactant Composition B is then packaged for use.

The foregoing discussion describes the synthesis of two components (Reactant Composition A and Reactant Composition B) that might be provided by a coating supplier and that can be used to form a polyurethane coating for some embodiments of the present invention. As discussed below, Reactant Composition A and Reactant Composition B can be applied to a film and reacted (e.g., by a film converter) to form the polyurethane coating on the film. In general, one part Reactant Composition A is mixed with one part Reactant Composition B. The Compositions are mixed together to ensure homogeneity, and are applied onto a target film at a target coating weight. To achieve adequate dynamic viscosity in these Samples, the target solids at application should be around 30%. The preferred coating technique is roll applied, either direct or reverse gravure, with or without a smoothing bar. Solvents are then removed by force dry, or air dry heated oven. The urethane reaction of Reactant Composition A and Reactant Composition B commences upon solvent removal. At a mix ratio of 1:1, the theoretical isocyanate index is ~1.4:1. For purposes of these examples, a polyurethane coating formed from Reactant Composition A and Reactant Composition B shall be referred to as PU Coating 1.

The comparative coating used in these examples is Siegwerk 11V143FG. This coating is a benchmark high gloss over printing varnish (OPV) generally applied using either flexographic, rotogravure or offset printing processes, or even using a coater. The reference OPV is a monocomponent solvent-based material that does not include polyurethane. In the examples below, it is referred as Comparative Coating.

Two monolayer films are formed on a 5-layer Collin coextrusion blown film line using an 80 mm die with a blow-up ratio of 2.0 and a lay flat width of 320 mm. Each monolayer film had a nominal thickness of 50 microns. Film 1 is formed from DOWLEX™ TG 2085B, which is a linear low density polyethylene having a density of 0.919 g/cm$^3$ and a melt flow index ($I_2$) of 0.95 g/10 minutes, which is commercially available from The Dow Chemical Company. Film 2 is formed from DOWLEX™ 2050B, which is a high density polyethylene having a density of 0.950 g/cm$^3$ and a melt flow index ($I_2$) of 0.95 g/10 minutes, which is commercially available from The Dow Chemical Company.

Figure 5:
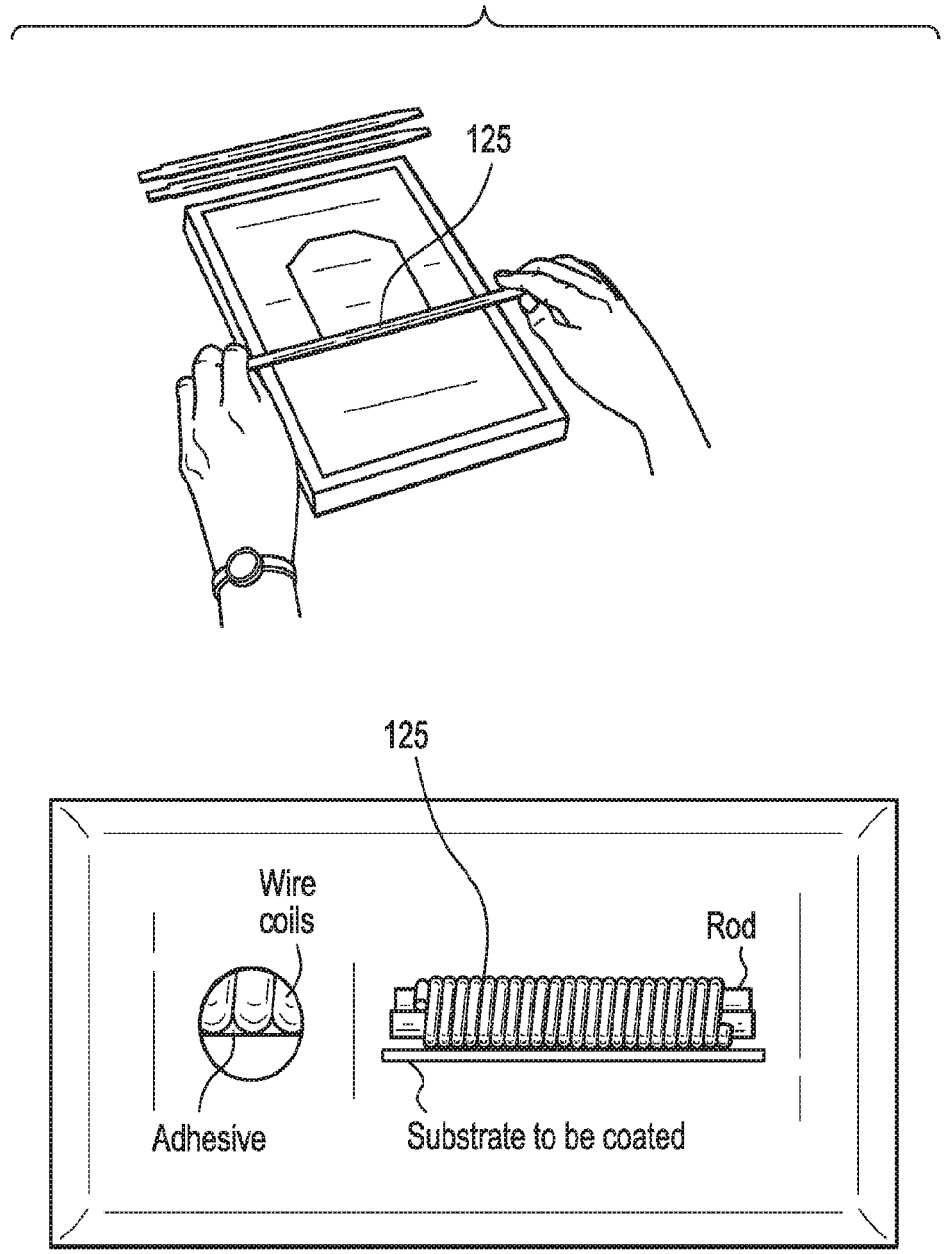
FIG. 5 illustrates the application of a coating to a film.

Samples of Film 1 and Film 2 are each coated with varying amounts of PU Coating 1 and Comparative Coating. The coating mixture is applied to the films from top-to-bottom using a Mayer bar 125 as shown in FIG. 5. The various samples are summarized in Table 1:

TABLE 1

| Sample | Film | Coating | Coating Amount (g/m$^2$) |
|---|---|---|---|
| Comparative Example A | Film 1 | None | — |
| Inventive Example 1 | Film 1 | PU Coating 1 | 1.5 |
| Inventive Example 2 | Film 1 | PU Coating 1 | 4 |
| Comparative Example B | Film 1 | Comparative Coating | 1.5 |
| Comparative Example C | Film 1 | Comparative Coating | 4 |
| Comparative Example D | Film 2 | None | — |
| Inventive Example 3 | Film 2 | PU Coating 1 | 1.5 |

TABLE 1-continued

| Sample | Film | Coating | Coating Amount (g/m²) |
|---|---|---|---|
| Inventive Example 4 | Film 2 | PU Coating 1 | 4 |
| Comparative Example E | Film 2 | Comparative Coating | 1.5 |
| Comparative Example F | Film 2 | Comparative Coating | 4 |

The thickness, Elmendorf tear in the machine and cross directions, and the 2% secant modulus in the machine and cross directions are measured for each film. Elmendorf tear is measured in accordance with ASTM D1922. Fifteen Elmendorf tear measurements are made and averaged for each sample. Secant modulus at 2% strain is measured in the machine direction (MD) and cross direction (CD) with an Instron Universal tester according to ASTM D882-12. Five different 2% secant modulus measurements are made and averaged for each sample. The results are shown in Table 2:

TABLE 2

| Sample | Thickness (mm) | 2% Sec. Mod., MD (MPa) | 2% Sec. Mod., CD (MPa) | Elmendorf Tear, MD (g) | Elmendorf Tear, CD (g) |
|---|---|---|---|---|---|
| Comparative Example A | 54.2 | 160 | 177 | 971 | 1154 |
| Inventive Example 1 | 58 | 221 | 232 | 933 | 1196 |
| Inventive Example 2 | 61 | 284 | 312 | 471 | 683 |
| Comparative Example B | 56.2 | 164 | 196 | 1148 | 1329 |
| Comparative Example C | 59.6 | 169 | 210 | 1004 | 1218 |
| Comparative Example D | 48.6 | 566 | 658 | 56 | 103 |
| Inventive Example 3 | 52.2 | 593 | 684 | 48 | 81 |
| Inventive Example 4 | 55.8 | 705 | 798 | 40 | 53 |
| Comparative Example E | 52.2 | 573 | 675 | 56 | 119 |
| Comparative Example F | 58.6 | 548 | 692 | 71 | 164 |

As shown in Table 2, the Inventive Films each show a higher 2% secant modulus than the corresponding Comparative Examples. At a coating amount of 1.5 g/m², the Inventive Films show a lower tear resistance than the Comparative Films at the same coating amount. The reduction in tear resistance is more substantial at a coating amount of 4 g/m². A reduction in tear resistance of the Inventive Films is also shown relative to the uncoated films. This data demonstrate that partially coating a film with PU Coating 1 can be used to provide an area (or areas) of reduced tear resistance relative to an uncoated portion of packages to facilitate opening or accessing the contents of the package.

That which is claimed is:

1. A partially coated film comprising:
   (a) a film having two outer surfaces, wherein a first outer surface is provided by a film layer that comprises from 70 to 100 percent by weight of a polyolefin having a density of 0.860 to 0.965 g/cm³; and
   (b) a coating on the first outer surface of the film comprising polyurethane,
   wherein the coating covers less than 25% of the surface area of the first outer surface of the film and wherein the coated portion of the film exhibits an Elmendorf tear in at least one of the machine direction or cross direction that is at least 20% less than the Elmendorf tear of the uncoated portion in the same direction, with the Elmendorf tear being measured in accordance with ASTM D1922.

2. The partially coated film of claim 1, wherein the coated film is a monolayer film.

3. The partially coated film of claim 1, wherein the coated film is a multilayer film.

4. The partially coated film of claim 3, wherein the film further comprises a barrier layer.

5. The partially coated film of claim 1, wherein the Elmendorf tear of uncoated portion of the film is at least 50 grams when measured in accordance with ASTM D1922.

6. The partially coated film according to claim 1, wherein the polyurethane is formed from: (a) a hydroxyl terminated polyol or urethane; and (b) an isocyanate-functional prepolymer.

7. The partially coated film according to claim 6, wherein the isocyanate-functional prepolymer comprises an aromatic isocyanate.

8. The partially coated film according to claim 6, wherein the hydroxyl terminated urethane comprises at least one of a hydroxyl terminated polyether-based urethane, a hydroxyl terminated polyester-based urethane, and a hydroxyl terminated polyester-polyether-based urethane.

9. The partially coated film according to claim 1, wherein the amount of coating on the coated portion of the first outer surface of the film is 1 to 7 g/m².

10. A laminate comprising the partially coated film of claim 1 laminated to a second film.

11. A package comprising the partially coated film according to claim 1.

12. The package of claim 11, wherein the package is a standup pouch and wherein the coated portion is proximate an upper edge of the pouch to facilitate opening of the pouch.

13. The package of claim 12, wherein the pouch comprises at least one side edge having a notch and wherein the notch is formed in the coated portion or adjacent to the coated portion.

14. The package of claim 11, wherein the package is a beverage container and wherein the coated portion is positioned at a location on the container to permit insertion of a straw.

* * * * *